US011359670B2

(12) United States Patent
Sun et al.

(10) Patent No.: US 11,359,670 B2
(45) Date of Patent: Jun. 14, 2022

(54) TRANSMISSION ROLLER, AND PIN-TEETH CYCLOID REDUCER WITH THE SAME AND BEARING WITH THE SAME

(71) Applicant: QUANTA MACHINERY CO., LTD., Suzhou (CN)

(72) Inventors: Zijian Sun, Suzhou (CN); Meizhu Zheng, Suzhou (CN); Xueyun Peng, Suzhou (CN); Lianxin Zhang, Suzhou (CN)

(73) Assignee: QUANTA MACHINERY CO., LTD., Suzhou (CN)

( * ) Notice: Subject to any disclaimer, the term of this patent is extended or adjusted under 35 U.S.C. 154(b) by 19 days.

(21) Appl. No.: 17/044,793

(22) PCT Filed: Jun. 12, 2018

(86) PCT No.: PCT/CN2018/090756
§ 371 (c)(1),
(2) Date: Oct. 1, 2020

(87) PCT Pub. No.: WO2019/237238
PCT Pub. Date: Dec. 19, 2019

(65) Prior Publication Data
US 2021/0088078 A1 Mar. 25, 2021

(51) Int. Cl.
*F16C 33/34* (2006.01)
*F16C 33/58* (2006.01)
(Continued)

(52) U.S. Cl.
CPC ............ *F16C 33/34* (2013.01); *F16C 33/585* (2013.01); *F16C 27/04* (2013.01); *F16C 2240/70* (2013.01); *F16H 55/10* (2013.01)

(58) Field of Classification Search
CPC .......... F16C 13/00; F16C 27/04; F16C 33/34; F16C 33/585; F16C 55/10; F16C 2237/00;
(Continued)

(56) References Cited

U.S. PATENT DOCUMENTS 1,694,031 A * 12/1928 Forsberg .................... F16H 1/32
475/168
5,695,425 A * 12/1997 Hashimoto ............... F16H 1/32
475/168
(Continued)

FOREIGN PATENT DOCUMENTS

CN 101699100 A 4/2010
CN 204533376 U * 8/2015 ............... F16H 1/28
(Continued)

*Primary Examiner* — Phillip A Johnson
(74) *Attorney, Agent, or Firm* — Cheng-Ju Chiang (57) ABSTRACT

The present invention provides a transmission roller, a pin-teeth cycloid reducer with the same and a bearing. The transmission roller comprises a hollow roller which is made by spirally and closely winding a steel strip or a steel wire, and the length of the hollow roller remains unchanged when both ends thereof distributed along the axial direction are squeezed. When the hollow roller is subjected to external pressure, the ends thereof will not be easily damaged, and will not extend to the middle part during use, thus having a long service life.

9 Claims, 7 Drawing Sheets

(51) Int. Cl.
*F16C 27/04* (2006.01)
*F16H 55/10* (2006.01)

(58) Field of Classification Search
CPC .... F16C 2240/70; F16C 2361/61; F16H 1/32; F16H 53/00; F16H 55/14; F16H 2001/323; F16H 1/2863; F16H 2001/327
See application file for complete search history.

(56) References Cited

U.S. PATENT DOCUMENTS

| | | | |
|---|---|---|---|
| 6,231,469 B1 * | 5/2001 | Wang | F16H 1/32 |
| | | | 475/162 |
| 7,938,748 B2 * | 5/2011 | Minegishi | F03D 7/0204 |
| | | | 475/163 |
| 9,097,322 B2 * | 8/2015 | Nakamura | F16H 1/32 |
| 2006/0120649 A1 * | 6/2006 | Risberg | F16C 33/61 |
| | | | 384/513 |

FOREIGN PATENT DOCUMENTS

| | | | | |
|---|---|---|---|---|
| CN | 105134906 A | | 12/2015 | |
| CN | 105299148 A | * | 2/2016 | ............. F16H 55/14 |
| CN | 205013590 U | * | 2/2016 | ............. F16H 55/55 |
| CN | 205013636 U | | 2/2016 | |
| CN | 206816760 U | * | 12/2017 | ............. F16H 57/12 |
| CN | 207002081 U | * | 2/2018 | ............. F16C 13/02 |
| DE | 102017100897 A1 | * | 7/2018 | ............. F16C 33/54 |
| FR | 2479369 A1 | | 10/1981 | |
| FR | 3050502 A1 | * | 10/2017 | ............... F16H 1/32 |

* cited by examiner

TRANSMISSION ROLLER, AND PIN-TEETH CYCLOID REDUCER WITH THE SAME AND BEARING WITH THE SAME

CROSS REFERENCE TO RELATED APPLICATIONS

The present application is a 35 U.S.C. § 371 National Phase conversion of International (PCT) Patent Application No. PCT/CN2018/090756, filed on Jun. 12, 2018, the disclosure of which is incorporated by reference herein. The PCT International Patent Application was filed and published in Chinese.

TECHNICAL FIELD

The present invention relates to the field of machinery, and more particularly, to a transmission roller which is not easily damaged under pressure and has a long service life, and a pin-teeth cycloid reducer with the transmission roller and a bearing.

BACKGROUND

In the field of machinery, transmission rollers are often used in pin-teeth cycloid reducers, bearings and other transmission devices. As traditional transmission rollers are solid rollers, the operation environment of the transmission devices is relatively harsh and overload problems may occur frequently, therefore, the solid rollers is likewise subjected to extra load, which causes abnormal wear and even damage to the solid rollers. This is also a common problem currently existed in the production of transmission devices. The accuracy of a newly assembled machine is good. However, after a short period of operation, the accuracy is greatly decreased and the lubricating oil quickly turns black, and the accuracy retention time is too short, which is far from meeting the requirements.

In order to solve this dilemma, the main measures taken in domestic are to further improve the processing and assembly accuracies, and strive to achieve the standards for original imported products. The main measure to improve accuracy is to use more advanced processing equipment, mainly imported processing equipment. However, facts prove that doing this alone cannot completely achieve the purpose and the resulting high production costs also make people doubt whether commercialization will be truly realized in the future, so as to obtain the ability to compete with foreign products.

In addition, it is also proposed to replace the traditional solid roller with an elastic hollow roller in the transmission device to make up for the undesirable problems caused by processing errors, operation wear and the like through elastic compensation. Practice proves that hollow rollers can deform and shrink slightly when subjected to pressure, so that no excessive interference fit is caused among the components of the transmission device due to processing errors or inaccurate assembly, or compensation is made for excessive clearance caused by wear; therefore, elastic compensation can indeed lower the requirements for processing accuracy, reduce wear, significantly extend the service life of the transmission device and maintain the accuracy.

However, how to further enhance the compression resistance of the elastic hollow roller and extend the service life thereof is another technical challenge to increase the service life of the transmission device, considering that the working conditions of the transmission device may be very harsh and situations such as overload impact and the like often occur.

In view of this, it is necessary to provide a new transmission roller and a pin-teeth cycloid reducer with the same and a bearing to solve the above technical problems.

SUMMARY

An objective of the present invention is to provide a transmission roller which is not easily damaged when subjected to pressure and has a long service life, and a pin-teeth cycloid reducer with the same and a bearing.

In order to achieve the above objective of the invention, the present invention provides a pin-teeth cycloid reducer which comprises a cycloid disk, a pin-teeth shell surrounding the outer side of the cycloid disk, and a pin-teeth component clamped between the cycloid disk and the pin-teeth shell, wherein the pin-teeth component comprises a plurality of transmission rollers which are evenly distributed along an inner circumferential direction of the pin-teeth shell. The transmission roller comprises a hollow roller which is made by spirally and closely winding a steel strip or a steel wire, and the length of the hollow roller remains unchanged when both ends of the hollow roller distributed along an axial direction of the hollow roller are squeezed.

As a further improvement of the present invention, the tube wall thickness of the hollow roller is between ¼ and ⅙ of the outer diameter of the hollow roller.

As a further improvement of the present invention, the outer diameter of the hollow roller is between 1.5 mm and 10 mm.

As a further improvement of the present invention, the transmission roller further comprises an inner core body which is located in the hollow roller, and a gap for elastic deformation of the hollow roller is provided between the inner wall surface of the hollow roller and the outer wall surface of the inner core body.

As a further improvement of the present invention, the inner core body is a solid cylinder or a spiral spring.

As a further improvement of the present invention, the inner core body is a spiral spring and the spiral direction of the spiral spring is opposite to that of the steel strip or the steel wire.

As a further improvement of the present invention, the transmission roller further comprises an elastic adhesive for bonding the hollow roller and the inner core body.

In order to achieve the above objective of the invention, the present invention provides a transmission roller for a transmission device, the transmission roller comprising a hollow roller which is made by spirally and closely winding a steel strip or a steel wire, and the length of the hollow roller remaining unchanged when both ends of the hollow roller distributed along the axial direction of the hollow roller are squeezed.

As a further improvement of the present invention, the wall thickness of the hollow roller is between ¼ and ⅙ of the outer diameter of the hollow roller.

As a further improvement of the present invention, the outer diameter of the hollow roller is between 1.5 mm and 10 mm.

As a further improvement of the present invention, the transmission roller further comprises an inner core body which is located in the hollow roller, and a gap for elastic deformation of the hollow roller is provided between the inner wall surface of the hollow roller and the outer wall surface of the inner core body.

As a further improvement of the present invention, the inner core body is a solid cylinder or a spiral spring.

As a further improvement of the present invention, the inner core body is a spiral spring and the spiral direction of the spiral spring is opposite to that of the steel strip or the steel wire.

As a further improvement of the present invention, the transmission roller further comprises an elastic adhesive for bonding the hollow roller and the inner core body.

In order to achieve the above objective of the invention, the present invention further provides a bearing which comprises an outer bearing ring and an inner bearing ring which are spaced from each other, and a plurality of the above-mentioned transmission rollers arranged uniformly between the outer bearing ring and the inner bearing ring.

The beneficial effect of the invention is that the pin-teeth cycloid reducer of the present invention uses a hollow roller made by spirally and closely winding a steel strip or a steel wire as a transmission roller, which enables the pin-teeth cycloid reducer to bear the pressure required. In addition, the ends of the hollow roller will not be easily damaged when the hollow roller is subjected to external pressure and will not extend to the middle part during use, thus having a long service life.

BRIEF DESCRIPTION OF THE DRAWINGS

Some specific embodiments of the present invention will be described in details hereinafter in an exemplary rather than restrictive manner with reference to the accompanying drawings. The same drawing marks in the accompanying drawings indicate the same or similar parts or sections. It shall be understood by those skilled in the art that these drawings are not necessarily drawn to scale. In the drawings.

DETAILED DESCRIPTION

In order to make the objectives, technical solutions and advantages of the present invention clearer, the present invention is described hereinafter in detail with reference to the accompanying drawings and specific embodiments.

Currently, the pin-teeth cycloid reducer has been widely used as a transmission device of the industrial robot. In particular, the pin-teeth cycloid reducer represented by the RV-type reducer has become the most important part in a robot system because of its compact structure and strong transmission ability thereof.

Figure 1:
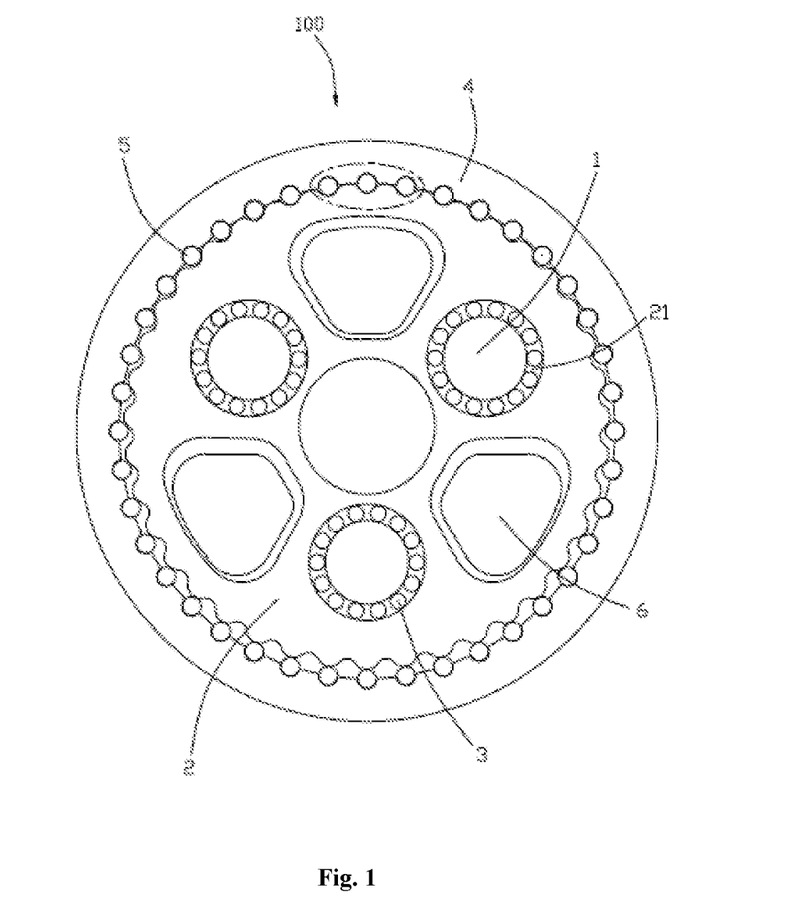
FIG. 1 is a schematic cross-sectional view of a pin-teeth cycloid reducer according to a preferred embodiment of the present invention.
Figure 2:
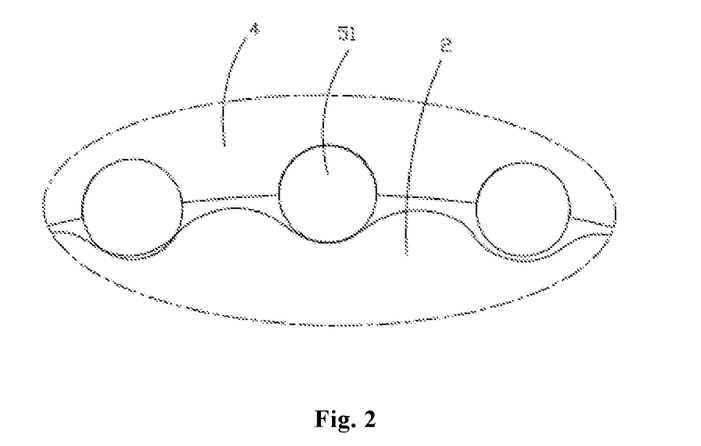
FIG. 2 is an enlarged view of a circled part shown in FIG. 1.

Referring to FIG. 1 in combination with FIG. 2, a preferred embodiment of the pin-teeth cycloid reducer 100 of the present invention is illustrated. The pin-teeth cycloid reducer 100 mainly comprises an input shaft (not shown) located in the middle to connect a servo motor (not shown), an input gear (not shown) provided at the end of the input shaft, a spur gear (not shown) engaged around the input gear, a crank shaft 1 fixed to the spur gear, a cycloid disk 2 provided to mate with the crank shaft 1, a bearing 3 provided between the crank shaft 1 and the cycloid disk 2 in a mating manner, a pin-teeth shell 4, a pin-teeth component 5 clamped between the cycloid disk 2 and the pin-teeth shell 4, and an output element 6 mated with the cycloid disk 2. The cycloid disk 2 is provided with holes 21 for holding the crank shaft 1 and the bearing 3. In the present invention, the assembly and working principle of various components of the pin-teeth cycloid reducer 100 can be referred to the Patent No. 201510640442.7, which is not repeated herein.

With reference to FIG. 2 for details, the pin-teeth component 5 comprises a plurality of needle teeth 51 which are evenly distributed along the inner circumferential direction of the pin-teeth shell 4. In the present invention, a transmission roller 7 as shown in FIGS. 4-8 is used as a pin-teeth 51, and the transmission roller 7 includes, but is not limited to, a hollow roller 71 with certain elasticity. In case of overloading and the like, the hollow roller 71 deforms and shrinks slightly under pressure to generate elastic compensation, so that no excessive interference fit is caused among various components of the cycloid disk 2, the pin-teeth shell 4 and the pin-teeth component 5 due to processing errors or inaccurate assembly, or compensation is made for excessive clearance caused by wear; therefore, it is possible to lower requirements for processing accuracy, reduce wear, significantly extend the service life of the transmission device, and maintain the accuracy.

Specifically, with reference to FIGS. 4-8, the transmission roller 7 comprises a hollow roller 71 made by spirally and closely winding with a steel strip 712 or a steel wire 712'. "Close winding" refers to spirally winding with the steel strip 712 or the steel wire 712' without gap. The length of the hollow roller 71 remains unchanged when both ends of the hollow roller 71 distributed along the axial direction of the hollow roller 71 are squeezed. Among the figures, FIG. 4 only shows a circle of a steel strip 712 or a steel wire 712' of the hollow roller 71 at an axial end.

Figure 3:
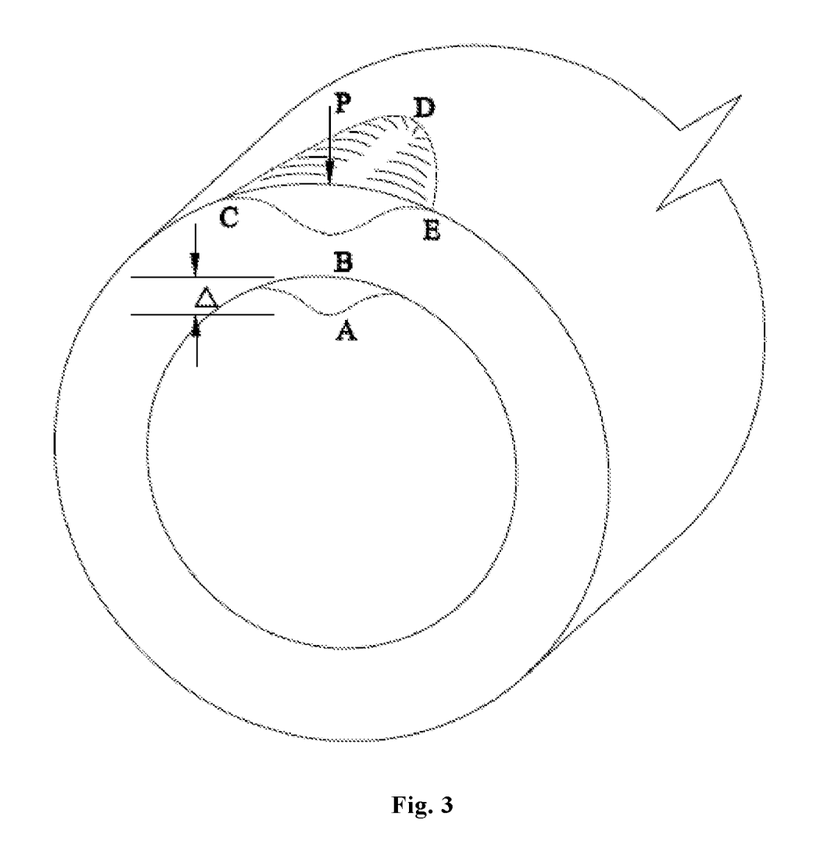
FIG. 3 is a schematic diagram showing the deformation on an end of a long hollow roller under pressure.

When the hollow roller 71 is subjected to external pressure, the ends thereof is not easily damaged, and will not extend to the middle part during use, thus having a long service life. The analysis and description are as follows:

With reference to FIG. 3, a hollow roller which is integral along the axial direction thereof can be understood as a hollow roller with a longer length, hereinafter referred to as a long hollow roller. When a pressure P is applied to the end of the long hollow roller, the end thereof can deform. Specifically, the wall of the hollow roller at the end will sag inward under the action of a pressure P, and a pit surrounded by CDE, as shown in the figure, is formed around. The pit is deepest at the end and shallowest at a point D which is the farthest from the end. After the end is sagged inward, a curve shown by the dotted line in FIG. 1 is formed. The original point B on the inner wall is moved to a point A after being sagged inward. The distance between the point A and point B is represented by "Δ" as shown in FIG. 3, namely, the maximum deformation distance herein.

Figure 4:
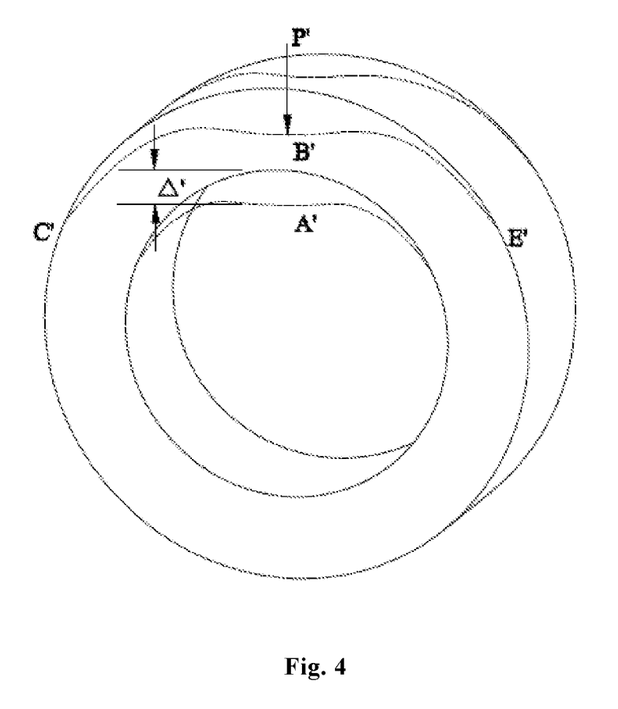
FIG. 4 is a schematic diagram showing the deformation on an end of a short hollow roller under pressure.
Figure 5A:
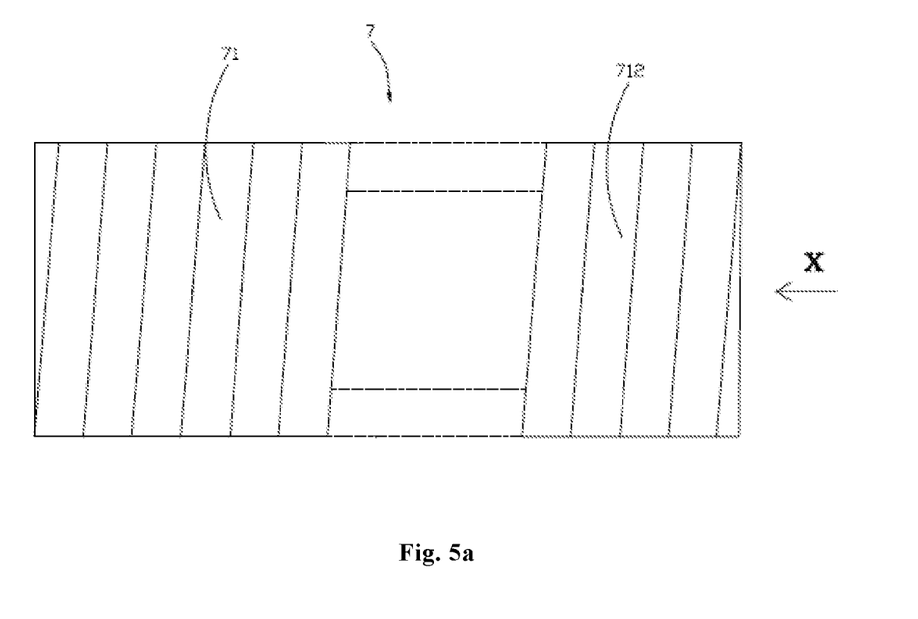
FIG. 5a is a structural schematic diagram of a transmission roller according to a preferred embodiment of the present invention.
Figure 5B:
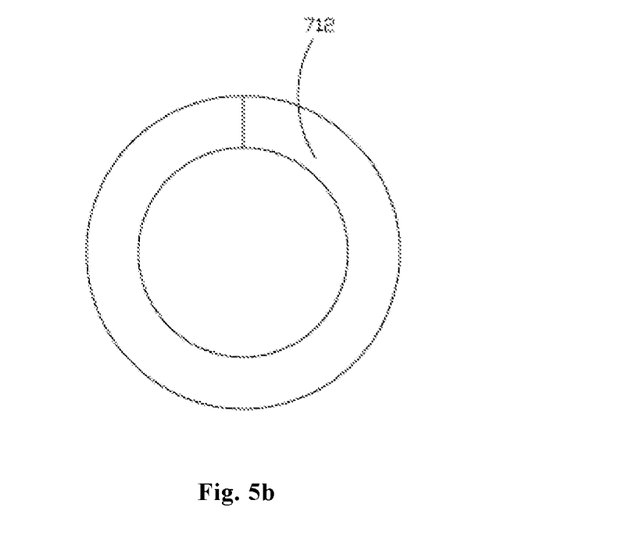
FIG. 5b is a schematic diagram of FIG. 5a in the X direction.
Figure 6A:
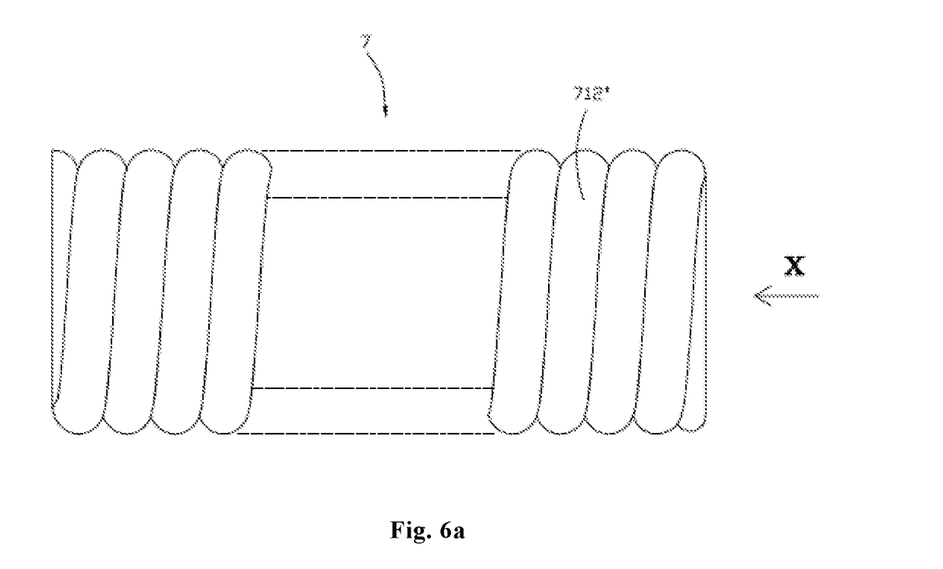
FIG. 6a is a structural schematic diagram of a transmission roller according to another preferred embodiment of the present invention.
Figure 6B:
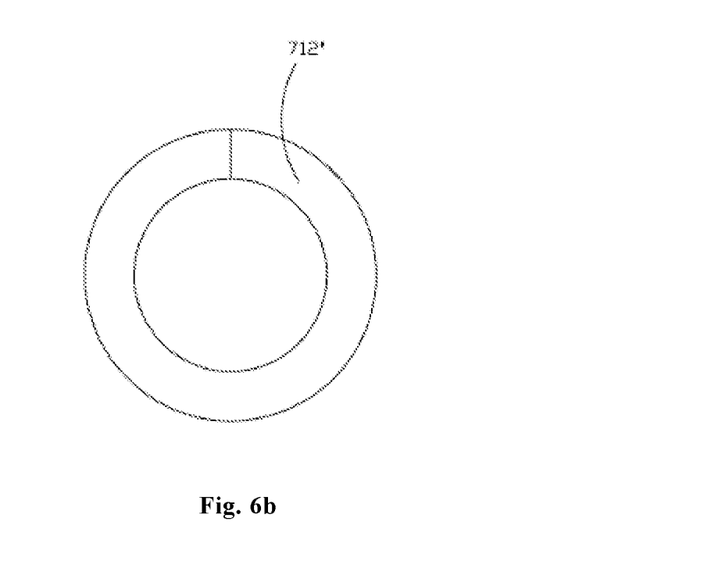
FIG. 6b is a schematic diagram of FIG. 6a in the X direction.

In the hollow roller 71 made by spirally and closely winding with a steel strip 712 or a steel wire 712' in the present invention, a circle of a steel strip 712 or a steel wire 712' at one axial end of the hollow roller 71 constitutes a short hollow roller shown in FIG. 4. When a pressure P' is applied to a short hollow roller which has the same diameter and wall thickness of the long hollow roller shown in FIG. 3, the sagging phenomenon also appears in the short hollow roller and the dotted line in FIG. 4 indicates the deformation under this circumstance. Under the action of an appropriate pressure P', the original point B' on the inner wall is moved to point A', and the sagging distance is Δ'. At this moment, it is found that the deformation distances are different and the deformation properties are completely different even if Δ'=Δ, namely the sagging distances under two circumstances are the same.

For the long hollow roller shown in FIG. 3, deformation can only occur in a small arc circle CDE near the end due to the constraint of the full-length stiffness; at point A, the shape of the wall is changed drastically and the radius of the curvature is very small. For the short hollow roller shown in FIG. 4, the deformation curves at both ends of the short hollow roller in the axial direction indicated by the dotted line shown in FIG. 4 are almost parallel and identical as there is no much constraint in the length direction. Because a very long arc from C' to E' along the circumference is involved in deformation, although the sagging distance Δ' of point B' on the inner wall is the same as the Δ shown in FIG. 3, the shape of the wall at that point is not changed greatly and the radius of curvature is very large. The change in the radius of curvature indicates the actual deformation at that point. Therefore, even if the sagging distances of both rollers are the same, the long hollow roller may crack, but the short hollow roller is safe, being not easily broken and having a long service life.

It can be known from the above analysis that the short hollow roller can withstand larger deformation than the long hollow roller. Therefore, the hollow roller 71 of the present invention can withstand larger deformation than a traditional hollow roller 71 which is integral along the axial direction. The transmission roller 7 of the present invention not only can perform the elastic compensation function of the long hollow roller, but also is not easy to be damaged and has a long service life when the pressure withstood thereby is the same.

The thickness and width of the steel strip 712 are not restricted, and the cross section of the steel wire 712' may be circular or irregular, as long as the hollow roller 71 having the stiffness required by the transmission roller 7 can be made in a manner of compact and close winding. When the surface of the hollow roller 71 is subjected to a pressure of one kilogram, the amount of deformation along the radial direction is between 2 and 5 microns.

In order to ensure sufficient contact between the transmission roller 7 and the pin-teeth groove and the cycloid disk 2, increase the contact area and reduce wear, the outer circumference of the hollow roller 71 can be ground to ensure the appropriate dimension of outer diameter and necessary degree of finish. For example, the outer diameter of the hollow roller 71 is between 1.5 mm and 10 mm to meet different requirements.

The wall thickness of the hollow roller 71 is between ¼ and ⅙ of the outer diameter of the hollow roller 71, and the wall thickness is between 0.3 mm and 2.5 mm. For example, when the outer diameter of hollow roller 71 is 6 mm, the thickness of the steel strip 712 or the wire diameter of the steel wire 712' is 1.5 mm; or when the outer diameter of the hollow roller 71 is 10 mm, the thickness of the steel strip 712 or the wire diameter of the steel wire 712' is 2.5 mm; or when the outer diameter of the hollow roller 71 is 1.5 mm, the thickness of the steel strip 712 or the wire diameter of the steel wire 712' is 0.3 mm.

The larger the outer diameter of the hollow roller 71 is, the thicker the wall of the hollow roller 71 shall be, which can make the hollow roller 71 itself have a certain impact-resistance strength and, at the same time, generate a certain elastic deformation for compensation when the hollow roller is squeezed by a large external force. The wall thickness of the hollow roller 71 is consistent with thickness of the steel strip 712 or is consistent with the wire diameter of the steel wire 712' along the radial direction of the hollow roller 71 after being compactly and closely wound.

Further, with reference to FIGS. 7a-8b, any of the above-mentioned transmission roller 7 further comprises an inner core body 72 which is located in the hollow roller 71, and a gap Δ" for elastic deformation of the hollow roller 71 is provided between the inner wall surface of the hollow roller 71 and the outer wall surface of the inner core body 72. Under the action of a very large load, namely, when the hollow roller 71 is subjected to an external pressure, the hollow roller 71 is elastically deformed inward and contacts with the inner core body 72. The inner core body 72 provides a strong supporting force to the hollow roller 71 to enhance the resistance thereof to overload impact, thus ensuring that the hollow roller 71 is not damaged when subjected to exceptionally strong impact pressure during the working process.

Figure 7A:
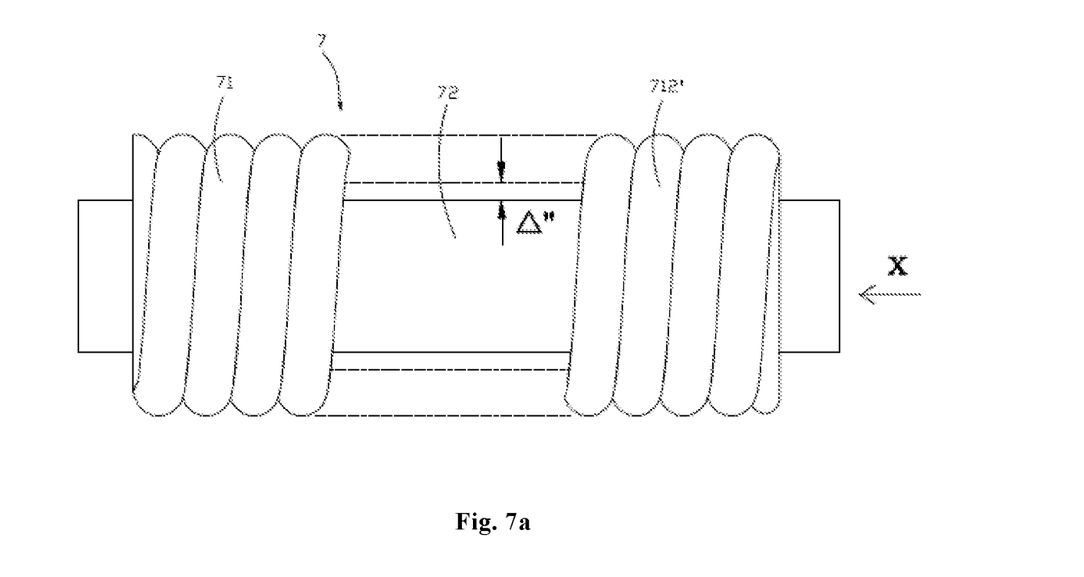
FIG. 7a is a structural schematic diagram of a transmission roller according to yet another preferred embodiment of the present invention.
Figure 7B:
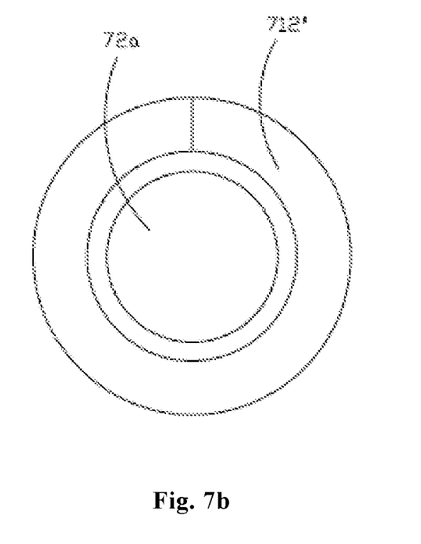
FIG. 7b is a schematic diagram of FIG. 7a in the X direction.

Specifically, with reference to FIGS. 7a and 7b, the inner core body 72 is a solid cylinder 72a having a strong resistance to pressure, which can prevent the hollow roller 71 from further deformation and causing structural damage.

Figure 8A:
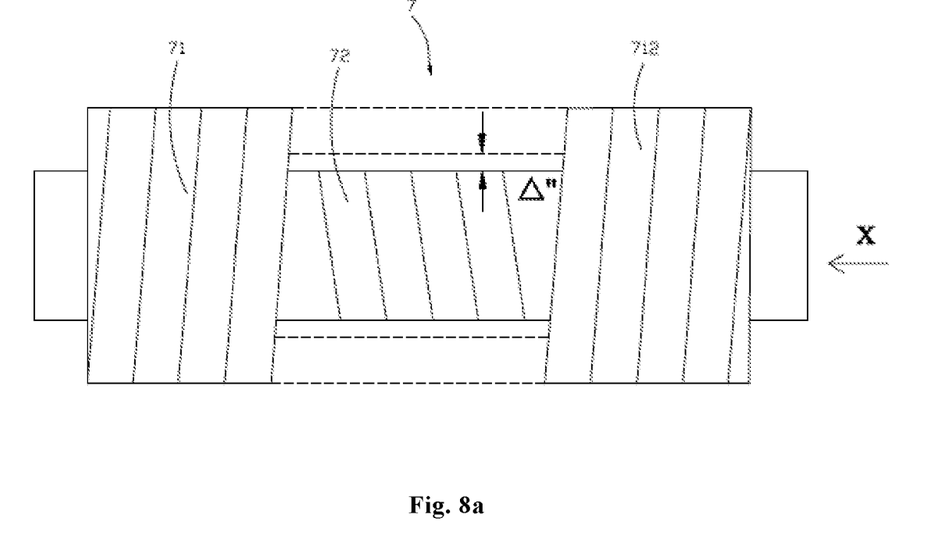
FIG. 8a is a structural schematic diagram of a transmission roller according to yet another preferred embodiment of the present invention.
Figure 8B:
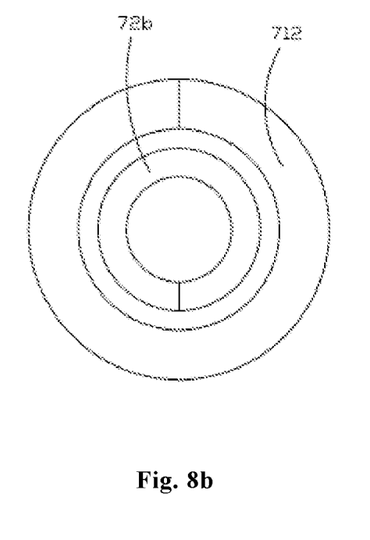
FIG. 8b is a schematic diagram of FIG. 8a in the X direction.

Alternatively, with reference to FIGS. 8a and 8b, the inner core body 72 is a spiral spring 72b made by spirally and closely winding with a steel wire 712' or a narrow and thin steel strip 712, which can reduce the final deformation degree of the hollow roller 71 and make the transmission roller 7 as a whole soft at first and then hard when stressed, thus achieving the best compensation effect.

In addition, when the hollow roller 71 is a spiral spring-shaped hollow structure made by spirally and closely winding with a steel wire 712' or a narrow and thin steel strip 712, and the inner core body 72 is also a spiral spring 72b made by spirally and closely winding with a steel wire 712' or a narrow and thin steel strip 712, the spiral winding directions of the hollow roller 71 and the spiral spring 72b are opposite. In general, the hollow roller 71 and the spiral spring 72b can be made by closely winding with narrow and thin steel strips 712 of different widths and thicknesses or steel wires 712' of different diameters to meet different requirements. In addition, the hollow roller 71 is generally more elastic than the spiral spring 72b and can effectively perform elastic compensation, or the spiral spring 72b generally has a higher strength than the hollow roller 71, thus having a better supporting function.

The transmission roller 7 further includes an elastic adhesive for bonding the hollow roller 71 and the inner core body 72, so that the hollow roller 71 and the inner core body 72 are integrated as a whole, and thus unable to slide at will. For example, the length of the hollow roller 71 may be set to be slightly shorter than that of the inner core body 72, namely, each of the two ends of the inner core body 72 can protrude respectively from each of the two ends of the hollow roller 71, thereby providing the convenience to set the elastic adhesive at the end to fix both of them.

Any of the above-mentioned transmission rollers 7 according to the present invention can also be used in other transmission devices. Refer to the above description for the structure and effect thereof, which is not repeated herein.

Figure 9:
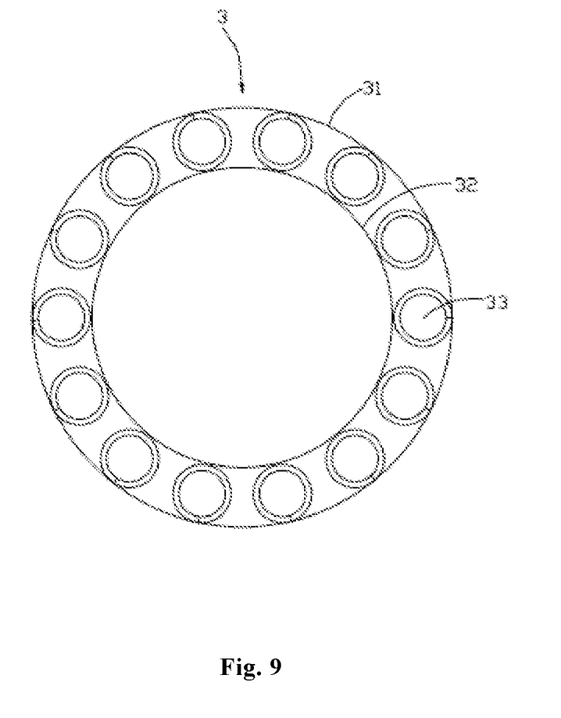
FIG. 9 is a structural schematic diagram of a bearing according to a preferred embodiment of the present invention.

With reference to FIG. 9, the above-mentioned various transmission rollers 7 of the present invention can also be used in a bearing 3 which may be used as a bearing 3 between the crank shaft 1 and the cycloid disk 2 of the above-mentioned pin-teeth cycloid reducer 100 as shown in FIG. 1, or may also be applied in another transmission device where a bearing 3 is required.

As shown in FIG. 9, the bearing 3 usually comprises an outer bearing ring 31 and an inner bearing ring 32 which are spaced from each other, and a plurality of the rollers evenly arranged between the outer bearing ring 31 and the inner bearing ring 32; the rollers 33 of the bearing 3 can be provided in various embodiments of the above-mentioned transmission roller 7, and can achieve the effect which can be achieved by the transmission roller 7 in the above embodiments. For instance, the bearing rate of the bearing 3 can be effectively guaranteed as described in the above-mentioned transmission roller 7 part, and meanwhile the manufacturing accuracy of the bearing 3 can be reduced, and the service life of the bearing 3 can be effectively improved.

The outer bearing ring 31 and the inner bearing ring 32 form the outer raceway and the inner raceway of the rollers 33 respectively; the outer bearing ring 31 and the inner bearing ring 32 may be independent structures or part of the structure of a product which uses the bearing, which can not only reduce the number of parts to reduce the cost but also reduce the superposition of errors. For example, when the bearing 3 is applied to the pin-teeth cycloid reducer 100 of the present invention, the outer bearing ring 31 and the inner bearing ring 32 are also composed of a cycloid disk 2 and a crank shaft 1 respectively, namely, the inner wall of the hole 21 on the cycloid disk 2 directly forms the outer raceway and the outer surface of the cam of the crank shaft 1 forms the inner raceway, so that the rollers 33 are clamped between the inner wall of the hole 21 and the outer surface of the cam of the crank shaft 1. The manufacturing error between the cycloid disk 2 and the crank shaft 1 or that of the rollers 33 can be offset directly by the elastic setting of the rollers 33 to make the bearing effect of the rollers 33 better.

The diameter of the roller 33 is set to be slightly larger than the gap between the inner raceway and the outer raceway, so that, in the static state, the roller 33 is squashed and slightly elliptical and in a pre-stressed state, being squeezed between the inner and outer raceways without a gap. In this way, the individual roller 33 is not be damaged due to overload, and the surfaces of the inner and outer raceways can be effectively protected.

In summary, the transmission roller 7 of the present invention comprises a hollow roller 71 which is made by spirally and closely winding with a steel strip 712 or a steel wire 712'. When subjected to external pressure, the end of the hollow roller is not easily damaged, and will not extend to the middle part during use, with a long service life, thereby increasing the service life of the transmission devices such as pin-teeth cycloid reducer and bearing.

In the pin-teeth cycloid reducer and a bearing of the present invention, the hollow roller 71 made by spirally and closely winding with a steel strip 712 or a steel wire 712' is used as a transmission roller 7, which enables the pin-teeth cycloid reducer and the bearing to bear the pressure required. In addition, when the hollow roller 71 is subjected to external pressure, the ends thereof will not be easily damaged and will not extend to the middle part during use, with a long service life, thereby increasing the service life of the transmission devices such as pin-teeth cycloid reducer and bearing.

The foregoing embodiments are provided to illustrate but not to limit the technical solutions of the present invention. Although the present invention is described in detail with reference to the preferred embodiments, it shall be understood by those skilled in the art that the technical solutions of the present invention may be modified or equivalently replaced without departing from the spirit and scope of the technical solutions of the present invention.

What is claimed is:

1. A pin-teeth cycloid reducer, comprising: a cycloid disk, a pin-teeth shell surrounding the outer side of the cycloid disk, and a pin-teeth component clamped between the cycloid disk and the pin-teeth shell, and the pin-teeth component comprising a plurality of transmission rollers which are evenly distributed along an inner circumferential direction of the pin-teeth shell, wherein the transmission roller comprises a hollow roller which is made by spirally and closely winding a steel strip or a steel wire, and the length of the hollow roller remains unchanged when both ends of the hollow roller distributed along an axial direction of the hollow roller are squeezed; wherein the transmission roller further comprises an inner core body which is located in the hollow roller, and a gap for elastic deformation of the hollow roller is provided between an inner wall surface of the hollow roller and an outer wall surface of the inner core body; the inner core body is a spiral spring, a spiral direction of the spiral spring is opposite to that of a steel strip or a steel wire.

2. The pin-teeth cycloid reducer according to claim 1, wherein a wall thickness of the hollow roller is between ¼ and ⅙ of an outer diameter of the hollow roller.

3. The pin-teeth cycloid reducer according to claim 1, wherein an outer diameter of the hollow roller is between 1.5 mm and 10 mm.

4. The pin-teeth cycloid reducer according to claim 1, wherein the transmission roller further comprises an elastic adhesive for bonding the hollow roller and the inner core body.

5. A transmission roller for a transmission device, wherein the transmission roller comprises a hollow roller which is made by spirally and closely winding a steel strip or a steel wire, and the length of the hollow roller remains unchanged when both ends of the hollow roller distributed along an axial direction of the hollow roller are squeezed; wherein the transmission roller further comprises an inner core body which is located in the hollow roller, and a gap for elastic deformation of the hollow roller is provided between an inner wall surface of the hollow roller and an outer wall surface of the inner core body; the inner core body is a spiral spring, a spiral direction of the spiral spring is opposite to that of a steel strip or a steel wire.

6. The transmission roller according to claim 5, wherein the wall thickness of the hollow roller is between ¼ and ⅙ of an outer diameter of the hollow roller.

7. The transmission roller according to claim 5, wherein an outer diameter of the hollow roller is between 1.5 mm and 10 mm.

8. The transmission roller according to claim 5, wherein the transmission roller further comprises an elastic adhesive for bonding the hollow roller and the inner core body.

9. A bearing comprising an outer bearing ring and an inner bearing ring which are spaced from each other, and a plurality of transmission rollers evenly arranged between the outer bearing ring and the inner bearing ring, wherein the roller is the transmission roller according to claim 5.

* * * * *